United States Patent [19]

Nakane et al.

[11] Patent Number: 5,132,068

[45] Date of Patent: Jul. 21, 1992

[54] PROCESSES FOR PRODUCING TRANSPARENT COPOLYESTER FILMS

[75] Inventors: Toshio Nakane; Yukihiko Kageyama; Hiroaki Konuma; Kenji Hijikata; Kenji Hijikata; Kuniaki Kawaguchi, all of Shizuoka, Japan

[73] Assignee: Polyplastics Co., Ltd., Osaka, Japan

[21] Appl. No.: 584,329

[22] Filed: Sep. 19, 1990

[30] Foreign Application Priority Data

Sep. 19, 1989 [JP] Japan .................. 1-242558

[51] Int. Cl.$^5$ .................. B29C 47/88; B29C 71/02
[52] U.S. Cl. .................. 264/211.180; 264/211.2; 264/235; 264/564
[58] Field of Search .......... 264/178 R, 211.12, 211.18, 264/211.2, 234, 235, 557, 558, 564, 567, 569

[56] References Cited

U.S. PATENT DOCUMENTS

| 4,328,333 | 5/1982 | Barbee et al. ............... 528/301 |
| 4,680,157 | 7/1987 | Fujii et al. ............... 264/235 X |

FOREIGN PATENT DOCUMENTS

| 287246 | 10/1988 | European Pat. Off. . |
| 2049538 | 4/1971 | Fed. Rep. of Germany . |
| 2458153 | 6/1975 | Fed. Rep. of Germany ...... 264/564 |
| 2149583 | 3/1973 | France . |
| 58-140215 | 8/1983 | Japan .................. 264/235 |
| 1314070 | 4/1973 | United Kingdom . |
| 1404340 | 8/1975 | United Kingdom . |

Primary Examiner—Leo B. Tentoni
Attorney, Agent, or Firm—Nixon & Vanderhye

[57] ABSTRACT

A process for producing a transparent film includes forming a melt from a copolyester having structural units represented by the following formulas I and II, respectively:

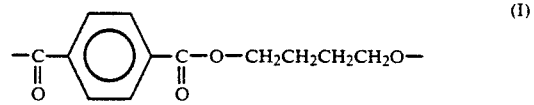

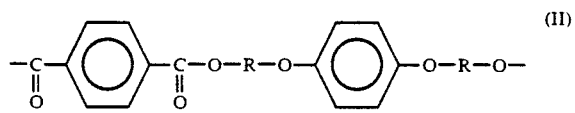

wherein R groups may be the same or different from each other are each selected from the group consisting of
—$CH_2CH_2$—, —$CH_2CH_2OCH_2CH_2$—, —CH—$CH_2$—,

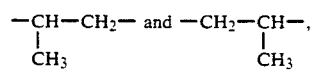

and the molar fraction ratio of the structural units of formula II to the total structural units of formulas I and II is between 0.02 to 0.020, which a melt of the copolyester is formed into a film, rapidly quenched to solidify the copolyester and impart low crystallinity thereto. The solidified film is aged at a temperature of 60 degree centigrade or below, and then heat-treated at a temperature between the glass transition point (Tg) of the copolyester and no greater than 2° C. below the melting point of the copolyester minus 2.

2 Claims, No Drawings

PROCESSES FOR PRODUCING TRANSPARENT COPOLYESTER FILMS

FIELD OF INVENTION

The present invention generally relates to processes for producing polyester films or sheets having high crystallinity and transparency properties.

BACKGROUND AND SUMMARY OF THE INVENTION

Aromatic polyesters generally represented by polyethylene terephthalate (PET) and polybutylene terephthalate (PBT) have been used extensively in the past as significant engineering plastics due to their excellent thermal resistance and other physical properties, such as mechanical strength and gas permeation resistance properties. Polybutylene terephthalate is not, however, typically used in end-use applications where high transparency is required since it has high crystallinity.

Transparent films of polyethylene terephthalate having low crystallinity can be relatively more easily produced by rapidly cooling molten PET because of its relatively low crystallization rate. However the crystallization of PET must be promoted by annealing procedures in order to improve its mechanical strength, gas permeation resistance and other similar properties. Annealing PET films, however, is problematic since elevated temperatures are typically employed in annealing procedures in order to enhance the crystallization efficiency. These elevated annealing temperatures tend to deleteriously affect the transparent properties of the film. That is, PET film sometimes becomes cloudy during annealing procedures at elevated temperatures due to the addition of nucleating agents which are employed to increase the resin's crystallization efficiency.

Spherulites are formed when molten polyethylene terephthalate resin is cooled slowly. The resulting resin product thus has high crystallinity due to the slow cooling, but has low transparency values due to scattering of visible light rays by the spherulites. What has been needed therefore are processes whereby polyester films having both high crystallinity and transparency properties may be produced.

Broadly, the present invention relates to a process for producing polyester film having high transparency values using a base polyester which is an aromatic copolyester containing specific comonomer units. The aromatic copolyester is then treated under specific film-forming conditions so as to obtain a film that is highly transparent.

More specifically, the present invention relates to processes for producing a transparent polyester film that are especially characterized by melt-blending a copolyester resin composition having structural units of the following general formulas (I) and (II):

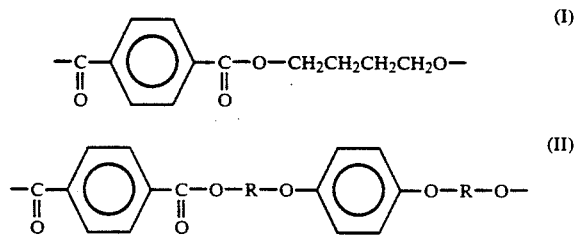

wherein R groups may be the same or different from each other and each represent a group selected from among —CH$_2$CH$_2$, —CH$_2$CH$_2$OCH$_2$CH$_2$—, —CH—CH$_2$— and

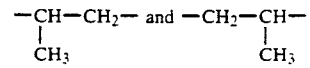

and the molar fraction ratio of the structural unit (II) to the total of structural units (I+II) is between 0.02 to 0.20.

The melt-blended copolyester is then rapidly cooled (quenched) to provide a film which exhibits low crystallinity. The cooled film is then aged at a temperature of 60° C. or below and is further heat-treated to increase crystallinity at a temperature between its glass transition point ($T_g$) and no greater than 2° C. below its melting point ($T_m$) The transparent polyester film produced by the processes of the present invention will exhibit a crystallinity of at least 70%, and a haze value of 20% or less after heat-treatment at 120° C.

The present invention thereby provides a process for producing a transparent film from a copolyester having the structural units represented by formulas (I) and (II), respectively, which generally comprises the steps of forming the copolyester into a sheet, rapidly cooling the sheet to impart low crystallinity thereto, aging it at a temperature of 60° C. or below, and then subsequently heating it to a temperature between the glass transition point ($T_g$) of the copolyester and no greater than 2° C. below the copolyester's melting point.

Further aspects and advantages of the present invention will become more clear from the reader after carefully considering the detailed description of the preferred exemplary embodiments thereof which follows.

DETAILED DESCRIPTION OF THE PREFERRED EXEMPLARY EMBODIMENTS

The starting compounds for forming a terephthaloyl group are terephthalic acid and its derivatives such as dialkyl esters or other diacylated compounds, which are used either singly or in combination of two or more of them. Among them, terephthalic acid and its dialkyl esters are preferred, with dimethyl terephthalate being particularly preferred.

An oxyalkyleneoxy group forming butylene terephthalate units, i.e. constituting units of formula (I), of the copolyester according to the present invention is introduced thereinto using 1,4-butanediol as the starting monomer. The other monomeric unit (II) of the copolyester according to the present invention is represented by the following formula:

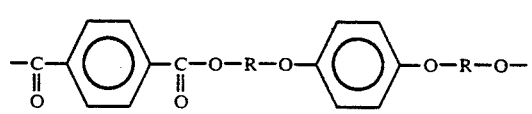

wherein R groups may be the same or different from each other and each represent a group selected from among —CH$_2$CH$_2$, —CH$_2$CH$_2$OCH$_2$CH$_2$—,

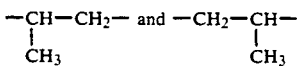

Examples of the starting compounds include hydroquinone/ethylene oxide (2 to 4 mol.) adduct and hydroquinone/propylene oxide (2 mol.) adduct. The hydroquinone/ethylene oxide (2 mol.) adduct is particularly preferred.

The comonomer introduction rate, i.e. molar fraction ratio of structural units of formula (II) to the total structural units (I+II) is between 0.02 to 0.20, particularly preferably between 0.03 to 0.10. When this value is below 0.02, the crystallization rate is too high to give the final transparent film or sheet. On the contrary, when this value exceeds 0.20, the final film or sheet that is produced will have a low crystallinity and unsatisfactory physical properties, such as mechanical strength and gas permeation resistance properties.

The copolyester resins can be produced by known condensation or transesterification reaction according to interfacial polycondensation, melt polymerization, solution polymerization or the like. A product having a higher degree of polymerization can be obtained by solid phase polymerization wherein the resulting resin is heat-treated under reduced pressure or in the presence of an inert gas.

A film or sheet having a low crystallinity can be produced from molten resin by the T-die or inflation methods. The T-die method is preferable. From the viewpoint of moldability, the intrinsic viscosity of the copolyester resin (as determined in o-chlorophenyl at 25° C.) is at least 0.7. The film or sheet thus produced is rapidly cooled to give a film having a crystallinity (as determined by the method to be described below) of as low as 80% or less.

The preferred thickness of the film produced by the process of the present invention is preferably between 0.01 to 2.5 mm, and particularly between 0.01 to 1 mm. In this regard, if the film is too thick, then only the surface thereof becomes transparent due to the rapid cooling effects while the interior of the film is cooled more slowly and thus tends to be more "cloudy". However, when the film is too thin, the inherent mechanical strength properties of the film cannot be fully obtained and thus the practical effects achieved by the present invention are less apparent. The film or sheet may be uniaxially or biaxially stretched after rapid cooling has been effected so as to provide a film having the desired thickness and/or to improve the film's properties.

The film is aged according to the present invention at a temperature of 60° C. or below by a technique whereby it is immersed within a heated fluid medium having a predetermined temperature. For example, the film according to the present invention may be aged by immersion in warm water, contact with a current of warm air, or may be heated by radiant heat of infrared rays or the like.

The preferred aging time (t) for a film having a thickness of 0.2 mm, for example, is determined by the following equation:

$$t_{(sec)} = exp\ [6.5 - (Temp\ (°C)/10)]$$

wherein "Temp" is the aging temperature that is employed.

The preferred aging time is, therefore, about 3 sec at 60° C., about 30 sec at 50° C., about 5 min 30 sec at 40° C., about 1 h at 30° C. or about 9 h at 20° C.

From the above, it is evident that the preferred aging temperature is between 20° to 60° C. When the aging temperature is below 20° C., aging time is excessively prolonged. On the contrary, when it exceeds 60° C., the film or sheet becomes cloudy due to its unfavorable rapid crystallization.

After aging at a temperature of not higher than 60° C., the film or sheet is then heat-treated at a temperature between its glass transition pint (Tg) and no greater than 2° C. below its melting point (Tm). The preferred temperature range is from Tg+10° C. to Tm−10° C. and particularly preferred temperatures are within the range of about 70° C. to about 150° C. When the heat-treatment temperature is below 70° C., an excessively long heat-treatment time is needed. However, when the heat-treatment temperature exceeds the above-noted temperature range, and thereby becomes too close to the melting point of the resin, then partial melting occurs resulting in nonuniform heat-treatment. The upper limit of the temperature range is, therefore, around 150° C.

The preferred relative crystallinity (CR) of a transparent, highly crystalline film or sheet after heat-treatment is at least 70%. The relative crystallinity herein refers to a valve determined by differential scanning calorimetry (DSC) to be described below. The transparency of the film or sheet is determined in terms of a haze value, which is determined with an integrating sphere type HTR meter according to JIS K 7105. The lower the haze value, the higher the transparency of the film.

When a film or sheet is required to have high transparency, then a press plate or a cooling roller as smooth as possible is desirably used. That is, since the transparency of the film will depend considerably upon the film's surface smoothness, any mechanical equipment that comes into contact with the film surface must be very smooth—that is, the processing equipment must impart not impart surface roughness to the film. Thus, when the haze value of the film exceeds 20%, the advantages that may be derived from its transparency properties are significantly minimized. As a result, the transparency represented in terms of its haze value is preferably 20% or less, and especially desirable films having a haze value of 20% or less may be obtained even after heat-treatment is conducted at temperatures of about 120° C.

The crystallinity of the film after heat-treatment is desirably at least 70%. That is, when the final product film has a crystallinity of below 70%, the advantages that are derived from crystallinity—such as gas permeation resistance, thermal resistance and surface hardness properties —become less evident.

As noted previously, the highly crystalline transparent films formed of the particular copolyester resin according to the present invention are produced by rapidly cooling (quenching) a film obtained by melt-molding so as to give a transparent film having low crystallinity. The quenched film is then aged and heat-treated so as to increase its crystallinity thereof without impairing its excellent transparency.

The films produced according to the process of the present invention therefor have the following benefits:

(1) The resin has both high thermal resistance and high transparency properties (i.e. the haze value is maintained at 20% or less) even at temperatures as high as about 120° C.

(2) The films of the present invention have a crystallinity of as high as at least 70% and thus, the films exhibit gas-barrier properties and heat shrinkability. As a result, the films of the present invention are especially well suited for use for food packaging materials, especially microwaveable food packaging materials.

(3) Since the films of the present invention exhibit high transparency values without impairing the mechanical properties thereof, the films may also be used as a film for use in "safety glass".

EXAMPLES

The following nonlimiting Examples will further illustrate the present invention.

PRODUCTION EXAMPLE 1 (PRODUCTION OF POLYESTER A)

194.2 parts by weight of dimethyl terephthalate, 175.8 parts by weight of 1,4-butanediol, 9.93 parts by weight of hydroquinone/ethylene oxide (2 mol) adduct and a predetermined amount of a transesterification catalyst were placed in a reactor provided with a stirrer and a distillation tube. After the gas in the reactor was sufficiently replaced with nitrogen, the temperature was elevated to 160° C. under atmospheric pressure and stirring was started. The temperature was further elevated to distill off methanol formed as a by-product. After the temperature reached 240° C., the pressure in the reactor was slowly reduced to 0.2 Torr and stirring was continued under a pressure of 0.2 Torr for 3.5 h to produce a copolyester resin having a limiting viscosity of 0.96. The following properties of the resulting copolyester resin were determined.

The value of (II)/(I+II) indicating the comonomer introduction rate was determined by $^1$H-NMR with trifluoroacetic acid-d as the solvent.

The copolyester resin was melted at 240° C., extruded with a T-die and cooled with a cooling roll at 25° C. Samples for DSC were cut from the film or sheet thus produced and the relative crystallinity of the product was determined with a DSC device.

The relative crystallinity was calculated according to the following equations:

(1) determination of the relative crystallinity (CR) of a rapidly cooled film or sheet:

$$CR = (\Delta Hm - |\Delta Hcc|)/(\Delta Hc)_{HOMO}$$

(2) determination of the relative crystallinity (CR) of an aged and heat-treated film or sheet:

$$CR = \Delta Hm/(\Delta Hc)_{HOMO}$$

wherein:
  $\Delta Hm$ represents the heat of melting of a crystal determined by the temperature elevation method,
  $\Delta Hcc$ represents the heat of transition of a cold crystallization peak, and
  $(\Delta Hc)_{HOMO}$ represents the heat of transition of an unmodified PBT determined by the temperature lowering method wherein the temperature of molten PBT was lowered at a rate of 10° C./min.

When the temperature of a low-crystallinity sample such as a rapidly cooled film or sheet is elevated, cold crystallization proceeds prior to the melting of the crystals. Accordingly, the essential relative crystallinity of the sample is determined by deducing the absolute value of the heat of transition of a cold crystallization peak ($\Delta Hcc$) from the heat of melting of the crystal ($\Delta Hm$).

The glass transition point (Tg) and melting point (Tm) were determined according to JIS K 7121.

PRODUCTION EXAMPLES 2 AND 3 (POLYESTERS B AND C)

The polymerization was conducted in the same manner as that of Production Example 1 except that the amounts of 1,4-butanediol and hydroquinone/ethylene oxide (2 mol) adduct were changed as specified in Table 1 to give copolyester resins having various component ratios.

PRODUCTION EXAMPLE 4 (POLYESTER D)

The copolyester resin B obtained in Production Example 2 was pelletized and the pellets were subjected to solid phase polymerization at 190° C. in a nitrogen stream to give a polyester having a high degree of polymerization.

COMPARATIVE PRODUCTION EXAMPLE 1 (POLYESTER E)

The monomers were polymerized in a ratio as specified in Table 1 in the absence of the hydroquinone/ethylene oxide (2 mol) adduct to give polybutylene terephthalate resin (PBT).

COMPARATIVE PRODUCTION EXAMPLE 2 (POLYESTER F)

The polymerization was conducted in the same manner as that of Production Example 1 except that the amounts of 1,4-butanediol and hydroquinone/ethylene oxide (2 mol) adduct were changed as specified in Table 1 to give a copolyester resin.

EXAMPLES 1 TO 4 AND COMPARATIVE EXAMPLES 1 AND 2

In order to clarify the difference in the properties of films or sheets depending on the difference of the starting polyesters, Polyesters A to G were evaluated under the same conditions of rapid cooling from the molten state, thickness of the film or sheet, aging conditions and heat treatment time.

In the tests, a polymer melted at 240° C. was extruded through a T-die onto a cooling roll at 25° C. at an extrusion rate controlled so as to adjust the thickness of the formed film or sheet to 0.1 mm to thereby achieve uniform rapid cooling conditions. Then the film or sheet was aged in a thermostatted bath at 40° C. for 10 min and immersed in hot water at 80° C. for 10 min to conduct heat treatment.

The polyester film was heat-treated in air at 120° C. for 30 min and then the haze and relative crystallinity thereof were determined. The oxygen permeability was determined according to JIS K 7126. The results are given in Table 2.

EXAMPLES 5 AND 6 AND COMPARATIVE EXAMPLE 3

Films and sheets were produced and evaluated in the same manner as that of Example 2 except that the aging temperature was changed. The results are given in Table 3.

EXAMPLES 7 AND 8 AND COMPARATIVE EXAMPLE 4

Films and sheets were produced and evaluated in the same manner as that of Example 2 except that the heat treatment temperature was changed. The results are given Table 4. The heat treatment at 150° C. was conducted in a hot air dryer.

COMPARATIVE EXAMPLE 5

When the heat treatment temperature was elevated to 210° C., the Polymer B was melted.

EXAMPLES 9 AND 10

Films and sheets were produced and evaluated in the same manner as that of example 2 except that the thickness was changed. The results are given in Table 5.

TABLE 1

|  | Production Example 1 | Production Example 2 | Production Example 3 | Production Example 4 | Comparative Production Example 1 | Comparative Production Example 2 |
|---|---|---|---|---|---|---|
| Polymer No. | A | B | C | D | E | F |
| DMT (parts by weight)*1 | 194.2 | 194.2 | 194.2 | 194.2 | 194.2 | 194.2 |
| BD (parts by weight)*2 | 175.8 | 171.2 | 166.6 | 171.2 | 180.2 | 134.4 |
| HQ2EO (parts by weight)*3 | 9.93 | 19.80 | 29.73 | 19.80 | — | 49.65 |
| (II)/(I + II) | 0.05 | 0.10 | 0.15 | 0.10 | 0 | 0.50 |
| [η] | 0.98 | 1.02 | 0.94 | 1.43 | 0.96 | 0.92 |
| Tm (°C.) | 208.0 | 200.2 | 180.2 | 200.4 | 222.0 | 152.1 |
| Tg (°C.) | 37 | 35 | 34 | 35 | 38 | 32 |

*1 Dimethyl terephthalate
*2 1,4-Butanediol
*3 Hydroquinone/ethylene oxide (2 mol) adduct

TABLE 2

|  | Ex. 1 | Ex. 2 | Ex. 3 | Ex. 4 | Comp. Ex. 1 | Comp. Ex. 2 |
|---|---|---|---|---|---|---|
| Polymer used | A | B | C | D | E | F |
| (II)/(I + II) | 0.05 | 0.10 | 0.15 | 0.10 | — | 0.50 |
| Tg (°C.) | 37 | 35 | 34 | 35 | 39 | 34 |
| Tm (°C.) | 208 | 200 | 193 | 200 | 222 | 158 |
| Haze after rapid cooling (%) | 1.1 | 1.1 | 1.0 | 1.3 | 67.8 | 1.0 |
| Relative crystallinity after rapid cooling (%) | 62 | 54 | 23 | 46 | 94 | 1.0 |
| Aging temperature (°C.) | 40 | 40 | 40 | 40 | 40 | 40 |
| Heat treatment temperature (°C.) | 80 | 80 | 80 | 80 | 80 | 80 |
| Haze after heat treatment (%) | 2.7 | 2.0 | 1.1 | 1.9 | 85.0 | 1.0 |
| Relative crystallinity after heat treatment (%) | 94 | 89 | 82 | 85 | 100 | 12 |
| Haze after heating at 120° C. (%) | 2.8 | 2.1 | 1.2 | 1.9 | 85.1 | 1.0 |
| Relative crystallinity after heating at 120° C. (%) | 94 | 90 | 83 | 86 | 100 | 12 |
| Oxygen permeability (cc/m²/24 h) (23° C., 0% RH) | 21.7 | 24.4 | 30.0 | 27.5 | 18.4 | 240 |

TABLE 3

|  | Ex. 2 | Ex. 5 | Ex. 6 | Comp. Ex. 3 |
|---|---|---|---|---|
| Polymer used | B | B | B | B |
| (II)/(I + II) | 0.10 | 0.10 | 0.10 | 0.10 |
| Tg (°C.) | 35 | 35 | 35 | 35 |
| Tm (°C.) | 200 | 200 | 200 | 200 |
| Haze after rapid cooling (%) | 1.1 | 1.1 | 1.1 | 1.1 |
| Relative crystallinity after rapid cooling (%) | 54 | 54 | 54 | 54 |
| Aging temperature (°C.) | 40 | 30 | 50 | 80 |
| Heat treatment temperature (°C.) | 80 | 80 | 80 | 80 |
| Haze after heat treatment (%) | 2.0 | 11.2 | 1.7 | 42.3 |
| Relative crystallinity after heat treatment (%) | 89 | 88 | 92 | 90 |
| Haze after heating at 120° C. (%) | 2.1 | 11.2 | 1.7 | 43.7 |
| Relative crystallinity after heating at 120° C. (%) | 90 | 89 | 92 | 90 |
| Oxygen permeability (cc/m²/24 h) (23° C., 0% RH) | 24.4 | 25.3 | 23.0 | 24.3 |

TABLE 4

|  | Ex. 2 | Ex. 7 | Ex. 8 | Comp. Ex. 4 |
|---|---|---|---|---|
| Polymer used | B | B | B | B |

TABLE 4-continued

|  | Ex. 2 | Ex. 7 | Ex. 8 | Comp. Ex. 4 |
|---|---|---|---|---|
| (II)/(I + II) | 0.10 | 0.10 | 0.10 | 0.10 |
| Tg (°C.) | 35 | 35 | 35 | 35 |
| Tm (°C.) | 200 | 200 | 200 | 200 |
| Haze after rapid cooling (%) | 1.1 | 1.1 | 1.1 | 1.1 |
| Relative crystallinity after rapid cooling (%) | 54 | 54 | 54 | 54 |
| Aging temperature (°C.) | 40 | 40 | 40 | 40 |
| Heat treatment temperature (°C.) | 80 | 50 | 150 | 30 |
| Haze after heat treatment (%) | 2.0 | 1.5 | 4.8 | 1.1 |
| Relative crystallinity after heat treatment (%) | 89 | 77 | 93 | 55 |
| Haze after heating at 120° C. (%) | 2.1 | 1.9 | 4.8 | 5.5 |
| Relative crystallinity after heating at 120° C. (%) | 90 | 84 | 93 | 82 |
| Oxygen permeability (cc/m²/24 h) (23° C., 0% RH) | 24.4 | 29.1 | 22.4 | 135 |

TABLE 5

|  | Ex. 2 | Ex. 9 | Ex. 10 |
|---|---|---|---|
| Polymer used | B | B | B |
| (II)/(I + II) | 0.10 | 0.10 | 0.10 |
| Tg (°C.) | 35 | 35 | 35 |
| Tm (°C.) | 200 | 200 | 200 |
| Thickness of film or sheet (mm) | 0.1 | 0.02 | 1.0 |
| Haze after rapid cooling (%) | 1.1 | 0.5 | 4.1 |
| Relative crystallinity after rapid cooling (%) | 54 | 29 | 67 |
| Aging temperature (°C.) | 40 | 40 | 40 |
| Heat treatment temperature (°C.) | 80 | 80 | 80 |
| Haze after heat treatment (%) | 2.0 | 0.8 | 13.0 |
| Relative crystallinity after heat treatment (%) | 89 | 88 | 85 |
| Haze after heating at 120° C. (%) | 2.1 | 0.8 | 13.4 |
| Relative crystallinity after heating at 120° C. (%) | 90 | 88 | 90 |
| Oxygen permeability (cc/m²/24 h) (23° C., 0% RH) | 24.4 | 120.0 | 0.4 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for producing a transparent film from a copolyester having structural units represented by the following formulas I and II, respectively:

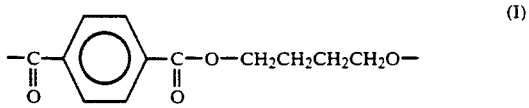

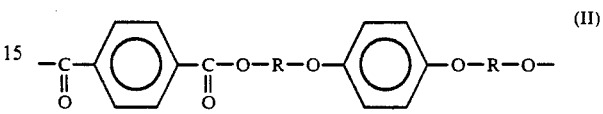

wherein R groups may be the same or different from each other are each selected from the group consisting of —CH₂CH₂, —CH₂CH₂OCH₂CH₂—, —CH—CH₂—,

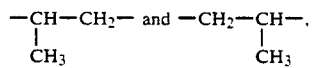

and the molar fraction ratio of the structural units of formula II to the total structural units of formulas I and II is between 0.02 to 0.20, which process comprises the steps of (1) forming a melt of the copolyester into a film,
(2) rapidly quenching the molten film to solidify the copolyester and impart low crystallinity thereto,
(3) aging the solidified film at a temperature of 60 degree centigrade or below to increase crystallinity, and then
(4) heat-treating the aged film to increase crystallinity at a temperature between the glass transition point (Tg) of the copolyester and no greater than 2° C. below the melting point of the copolyester, to provide a transparent film.

2. The process as claimed in claim 1, in which the film is produced by T-die molding.

* * * * *

UNITED STATES PATENT AND TRADEMARK OFFICE
CERTIFICATE OF CORRECTION

PATENT NO. : 5,132,068
DATED : July 21, 1992
INVENTOR(S) : Toshio NAKANE, et al

It is certified that error appears in the above-identified patent and that said Letters Patent is hereby corrected as shown below:

ON THE TITLE PAGE:

item [57] in the ABSTRACT, second column, 8 lines from the bottom, change "0.02 to 0.020, which a" to read --0.02 to 0.20. A--.

item [57] in the ABSTRACT, second column, last line, delete --minus 2--.

Column 4, line 28, change "valve" to --value--.

Column 4, line 42, delete "impart" (first occurrence).

Column 7, line 16, change "example" to read --Example--.

Signed and Sealed this

Fourteenth Day of September, 1993

Attest:

BRUCE LEHMAN

Attesting Officer          Commissioner of Patents and Trademarks